United States Patent [19]
Locke, Jr. et al.

[11] Patent Number: 4,716,520

[45] Date of Patent: Dec. 29, 1987

[54] METHOD OF CHECKING CHANNEL CONNECTIONS AND DETECTING HEATER CIRCUIT AND TEMPERATURE SENSOR MALFUNCTIONS IN MULTI-CHANNEL CLOSED LOOP HOT MELT HEATING SYSTEMS

[75] Inventors: Philip F. Locke, Jr., Mentor; Mark J. Ignatius, Lakewood, both of Ohio

[73] Assignee: Nordson Corporation, Amherst, Ohio

[21] Appl. No.: 26,014

[22] Filed: Mar. 16, 1987

Related U.S. Application Data

[62] Division of Ser. No. 821,005, Jan. 22, 1986.

[51] Int. Cl.$^4$ .................... F25B 13/00; G10M 19/00; G05D 23/00
[52] U.S. Cl. .................................... 364/186; 364/477; 364/557; 364/580; 371/20; 371/24
[58] Field of Search ............... 364/184, 185, 186, 477, 364/557, 570, 580; 371/20, 24

[56] References Cited

U.S. PATENT DOCUMENTS

| | | | |
|---|---|---|---|
| 3,795,916 | 3/1974 | Wallace et al. | 364/184 |
| 4,541,066 | 9/1985 | Lewandowski | 364/580 |
| 4,574,871 | 3/1986 | Parkinson et al. | 364/184 |
| 4,577,149 | 3/1986 | Zbinden | 364/557 |

Primary Examiner—Jerry Smith
Assistant Examiner—Allen MacDonald
Attorney, Agent, or Firm—Wood, Herron & Evans

[57] ABSTRACT

A method of checking to determine (a) whether the heating elements and temperature sensors of the various components of a hot melt heating and dipensing system, such as, hot melt dispensers, hoses, and associated reservoir and manifold, are connected in proper circuit configuration, (b) whether any of the heating circuits are in an open-circuit condition and/or their respectively associated signal-controlled switches which control energization of the heaters thereof are short circuited, and (c) whether any of the temperature sensors are open-circuited. The checking is performed by a microprocessor having multiple channels to different ones of which are connected the sensors and signal-controlled switches of the different system components.

8 Claims, 4 Drawing Figures

METHOD OF CHECKING CHANNEL CONNECTIONS AND DETECTING HEATER CIRCUIT AND TEMPERATURE SENSOR MALFUNCTIONS IN MULTI-CHANNEL CLOSED LOOP HOT MELT HEATING SYSTEMS

This is a division of application Ser. No. 821,005 filed Jan. 22, 1986.

This invention relates to hot melt heating and dispensing, and particularly to methods to detect component connection configuration errors and heater circuit malfunctions.

Hot melt heating and dispensing systems typically include a reservoir into which adhesive in pellet form is placed for the purpose of converting it to a molten state from which it can be selectively fed under pressure via a manifold to one or more dispensers which connect to the manifold via respectively associated hoses. In addition to a heater in the reservoir, there may also be a heater in the manifold, as well as in each of the dispensers and the respective hoses which connect the dispensers to the manifold. Associated with each heater is a temperature sensing element, preferably a resistor whose resistance is temperature-dependent, for example, exhibiting a resistance which increases and decreases as the temperature increases and decreases, respectively. Also associated with each component heater is a signal-controlled switch, such as a solid state relay, electronic switch, SCR, triac, etc., which is rendered conductive on a selective basis when the temperature of the component in question, as sensed by its respectively associated temperature-dependent resistor, is below a predetermined set point.

A microcomputer, which is input with the desired temperatures of the various system components which are heated, is provided. The microcomputer is responsive to the various temperature sensors for selectively energizing the heaters under closed loop control for maintaining the temperatures of the various components at the desired set point values.

In closed loop hot melt heating and dispensing systems, it is desirable to check the configuration of circuit connections between the microcomputer and the heater circuits and temperature sensors of the various system components which are under control of the microcomputer to be sure that the heater circuit and associated temperature sensor of each of the system components are connected to the same input channel of the microcomputer. For example, it is important to check that the heater circuit signal-controlled switch and temperature sensor for a particular system component, such as hose 1, are connected to the same channel of the microcomputer so that if the temperature sensor of hose 1 reflects a need for heat, the signal-controlled switch for the heater of hose 1 will be rendered conductive to energize the heater of hose 1 and not the heater of some other hose. The same is true for the heater and temperature sensor of other hoses, such as hose 2, as well as for other components of the system, such as the dispensers, manifold, reservoir, etc. It is also desirable to determine, for each channel of the microcomputer, if a component is, or is not, connected.

In addition, it is also desirable to periodically check for malfunctions, such as open circuits or short circuits, in the heater circuit and/or its associated temperature sensor. If a signal-controlled switch is short circuited, its associated heater will be energized excessively causing the component, such as a hose, to burn up or otherwise degrade. Similarly, it is desirable to determine the existence of an open circuit in the heating circuit to ensure that the hose will be maintained at the desired temperature necessary to maintain the adhesive in a molten condition as it flows between the reservoir manifold and the dispensers. The same is also true for the dispensers, manifold, and reservoir. For similar reasons it is also desirable, in conjunction with the foregoing, to determine if the temperature sensors are open-circuited or short-circuited.

Accordingly, it has been an objective of this invention to provide, when the system is initialized prior to each use thereof, a method for checking the correctness of the connections between the various channels of the microcomputer and the signal-controlled switches, heaters, and temperature sensors of each channel, as well as determine if a channel has connected to it a fully operational component, such as a properly functioning hose heater and associated signal-controlled switch and sensor. This objective has been accomplished in accordance with certain of the principles of this invention by utilizing a method which includes the steps of:

(a) Providing deactivation signals simultaneously to the signal-controlled switch control lines of all channels while checking for current flow through the heaters. If under such circumstances, with none of the signal-controlled switches supposedly being in a conductive condition, no current flow is detected through any of the heaters, it is concluded that the signal-controlled switches operate correctly and the method proceeds to the next step.

(b) Providing an activation signal to the control line of the signal-controlled switch which controls energization of the heater of the system component connected to microcomputer channel 1. If current flow in the heater circuit is sensed, it is assumed that the signal-controlled switch of the heater circuit of channel 1 is properly connected to the input of the microcomputer associated with channel 1.

(c) Checking the temperature sensor by, assuming it is of the preferred temperature-dependent resistor type, providing a constant current signal from a regulated current supply incorporated in the microcomputer to the resistive temperature-sensing element connected to channel 1. If the voltage across the resistive temperature-sensing element, after being suitably processed by the microcomputer to produce a temperature correlated thereto, reflects a temperature which is neither above the upper temperature limit nor below the lower temperature limit of the component as stored in the computer, the temperature-sensing element is considered to be both operative and properly connected to the temperature-sensing input of channel 1. If the temperature-sensing element of channel 1 is open circuited, effectively representing a resistance of infinite magnitude, when an attempt is made to pass therethrough a regulated current of preset value, an extremely high voltage will be sensed, which when processed to produce a temperature correlated therewith, results in a temperature value which far exceeds the upper temperature limit of the components connected to channel 1. Thus, the open circuit condition of the temperature-sensing element is detected and an appropriate display provided. If the temperature-sensing element connected to channel 1 is short circuited, that is, has a very low resistance, when input with a regulated current of preset magnitude a very low voltage is sensed, correlating to a temperature well below the lower temperature limit, which will produce an appropriate indication that the temperature sensor connected to channel 1 is short circuited. Assuming the temperature sensor of channel 1 is not defective, when input with a signal of controlled current level, the temperature correlated to the sensed voltage will lie within the maximum and minimum permissible temperature levels. This condition, coupled with the fact that the heater circuit for channel 1 was previously determined to be functional, indicates that there is a component connected to channel 1 and that it is operative.

If in step (b) above, when a signal-controlled switch activation signal was applied to channel 1, current flow was not sensed, it is assumed that a component is not connected to channel 1. This by itself is not considered to be a system configuration error since it is not necessary that components be connected to all channels. Further checking, however, is undertaken.

(d) The temperature-sensing resistor of the channel 1 component is checked in the manner described in step (c) to determine if the temperature sensor is open, short circuited, or functional. If this check shows the temperature sensor of channel 1 to be functional, a channel configuration error is present since it is improper for the temperature sensor to be operative when its associated heater is not connected. If the temperature sensor check shows that the temperature sensor is short circuited, a channel configuration error is also present since the heater associated therewith has previously been demonstrated to be disconnected. In addition, it reveals a short-circuited sensor is present in the misconnected sensor. If the temperature sensor of channel 1 is demonstrated to be open circuited, which is tantamount to being disconnected, the entire channel is deemed to be disconnected inasmuch as both the temperature sensor and its associated heater have been shown to be disconnected. An appropriate indication is given that channel 1 does not have a component connected thereto.

After channel 1 has been checked to determine if a functional heater and temperature-sensing resistor are correctly connected thereto, steps (b), (c), and (d) above are repeated for the heater and temperature-sensing resistor connected to channel 2. Similarly, channels 3, . . . n are sequentially subjected to steps (b), (c), and (d) to confirm if a correctly functioning heater and temperature-sensing resistor are properly connected to the respective channels of the microcomputer.

In accordance with a further aspect of the invention, the temperatures of the resistive temperature-sensing devices of each channel found to be operative and properly connected, as described above, are periodically sensed and compared with desired temperature set points entered and stored into the microcomputer. Utilizing closed loop control techniques, if the sensed temperature of a particular channel is below the desired set point, the signal-controlled switch associated with that channel is activated for a proportional fraction of a cyclic control period depending upon the difference between the actual temperature and the set point temperature, with the fraction increasing and decreasing as the temperature difference increases and decreases, respectively. If the sensed temperature is above the desired set point temperature, the signal-controlled switch is not energized. In one preferred form of the invention, the cyclic control period is 300 milliseconds, and depending upon the difference between the actual and set point temperatures, the signal-controlled switch may be energized anywhere between zero percent and one hundred percent of each recurring 300 ms control period.

In accordance with certain additional principles of this invention, a method is provided for periodically checking to detect short circuited signal-controlled switches during operation of the hot melt heating and dispensing system. This is accomplished by scanning the different microcomputer channels and while doing so monitoring the duty cycle of the signal-controlled switches of each channel. When the energization fractions of the control periods, or duty cycles, of all the signal-controlled switches connected to the various channels being scanned are zero percent, indicating that their associated temperature-sensing elements are equal or above the desired set point temperature, a check is made of each individual channel to determine if the signal-controlled switch associated therewith is short circuited. This is accomplished utilizing a method which includes the following steps:

(a) Determining whether the temperature of the resistive temperature-sensing device associated with the channel in question has risen since the duty cycle of its associated heater-energizing signal-controlled switch was first set to zero percent. If the temperature has not risen, the signal-controlled switch is considered to be properly operating. If the temperature has risen, the malfunction checking process continues.

(b) Deactivation signals are input to the signal-controlled switches of all channels to render their respective signal-controlled switches nonconductive and the current flowing through the heaters is sensed. If there is no current flowing through the heaters under such conditions, the signal-controlled switches are considered to be operational. If current is sensed flowing through one or more of the heaters, the entire system is shut down and a display is provided indicating that one of the signal-controlled switches is short circuited.

In accordance with certain further principles of the invention, a method is provided for determining the presence of an open circuit in the heater circuit during the signal-controlled switch duty cycle monitoring and channel scanning process. More particularly, as the channels are sequentially scanned, they are monitored to determine channels having the maximum duty cycle of one hundred percent corresponding to sensor temperatures which are well below their respective set point temperatures. When such a channel is found, the following steps are followed:

(a) A determination is made, for a particular channel in question, whether the temperature has fallen since the duty cycle of the signal-controlled switch for that channel was first set to one hundred percent. If it has not, it is assumed that the heating circuit is operational. If the temperature has fallen since the duty cycle of the signal-controlled switch of the associated channel under test was first set to one hundred percent, the process continues.

(b) An activation signal is applied to the signal-controlled switch of the channel in question and deactivation signals momentarily applied to the signal-controlled switches of all other channels and current through the heaters sensed. If heater current flow is sensed, the heater circuit is assumed operational. If heater current is not sensed with an activation signal applied to the signal-controlled switch of the channel under test, the system is shut down and a display provided indicating an open heater circuit.

These and other features, objectives, and advantages of the invention will become more readily apparent from a detailed description of the invention taken in conjunction with drawings in which.

Figure 1:
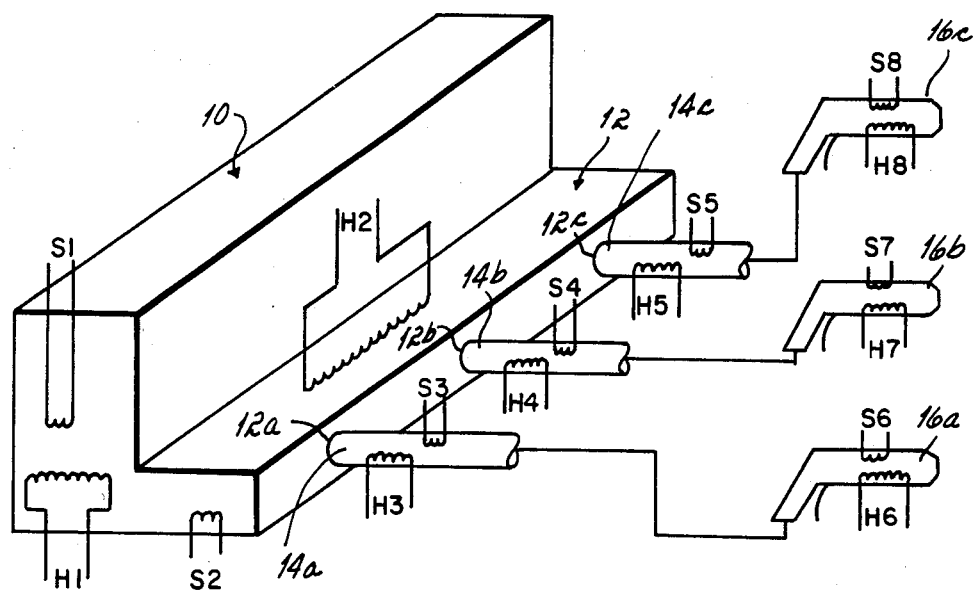
FIG. 1 is a perspective view, in schematic form, of a hot melt heating and dispensing system with which the method of this invention is useful.

With reference to FIG. 1 a typical hot melt heating and dispensing system is shown of the type with which the channel connection error and heater circuit component malfunction detecting method can be advantageously employed. More particularly, the system includes a tank or reservoir 10 which is provided with a heater H1 which is shown schematically. Associated with the interior of the tank 10 is a temperature-sensing element S1, also shown schematically. In practice, solid pellets of adhesive material are poured into the tank 10 where they are heated by the heater H1, eventually being rendered molten when they reach a temperature which varies depending upon the composition of the adhesive. The operation of the heater H1 is under closed loop control by a microcomputer, to be described, which has connected to one channel thereof the control electrode of the signal-controlled switch R1 (shown in FIG. 2) for the reservoir heater H1 and the associated temperature-sensing element S1.

In one preferred form the temperature-sensing element S1 is a temperature sensitive resistor having a resistance characteristic which increases and decreased with increasing and decreasing temperature, respectively. One form of resistance temperature detecting element, particularly useful for hoses, is disclosed in co-pending application Ser. No. 778,864, filed Sept. 23, 1985, entitled Resistance Temperature Detector Assembly and Method of Manufacture, in the name of Robert G. Baker, assigned to the assignee of this application. The entire disclosure of the Baker application is incorporated herein by reference. Obviously, other types of detecting elements can be used.

Located at the lower portion of the reservoir 10 is a manifold 12 having several output ports 12a, 12b, 12c, etc. The manifold 12 is also provided with a heater H2 and an associated resistive temperature-sensing element S2 for assisting in maintaining adhesive in the manifold 12 at the desired melt temperature under closed loop control by the microcomputer which has connected to another channel thereof the output from temperature sensor S2 and the control electrode of the signal-controlled switch for heater H2.

One or more pumps (not shown) may also be associated with the reservoir 10 and/or manifold 12 for providing pressurized molten adhesive at the manifold output ports 12a, 12b, 12c, etc. If one or more pumps are provided, each pump may be provided with its own resistance heating element (not shown) and an associated temperature-sensing element (not shown). The pump heater circuit signal-controlled switch control electrode and associated temperature-sensing element are connected to a still further channel of the microcomputer for maintaining the temperature of the adhesive in the pump at the desired melt temperature under closed loop control.

Connected to each of the manifold output ports 12a, 12b, 12c is a hose 14a, 14b, and 14c which at its other end is connected to a selectively operable hot melt dispenser 16a, 16b, 16c, respectively. The hoses 14a, 14b, and 14c, as is well known in the art, contain heaters H3, H4, and H5, as well as associated resistive temperature-sensing elements S3, S4, and S5, respectively. Similarly, the dispensers 16a, 16b, and 16c contain heaters H6, H7, and H8, respectively, and associated resistive temperature-sensing elements S6, S7, and S8, respectively. The heater signal-controlled switch control electrode and associated temperature-sensing element of any given hose are connected to a different channel of the microcomputer to enable the microcomputer to maintain, under closed loop control, the temperature of the adhesive in the hose in question at a desired set point entered into the microcomputer. Similarly, the heater signal-controlled switch control electrode and associated temperature-sensing element of any given dispenser are connected to a different channel of the microcomputer to enable the microcomputer to maintain, under closed loop control, the temperature of the adhesive in the given dispenser at a desired set point entered into the microcomputer.

In practice, the electrical wires to the heater and temperature sensor of a dispenser are routed back along its associated hose for connection to suitable plug-type electrical connectors located proximate the manifold port to which the hose is connected. Thus, a pair of electrical wires for energizing the heater H6 of dispenser 16a would be routed back along the hose 14a to an electrical connector mounted proximate manifold port 12a. Likewise, a pair of electrical wires connected at one end to temperature-sensing element S6 of dispenser 16a are routed back along hose 14a for connection to a suitably located electrical connector which is also mounted proximate manifold port 12a to which the hose 14a is connected. In a similar fashion, electrical wires from the hose heater H3 and the temperature-sensing element S3 are routed back along the hose 14a to electrical connectors located proximate manifold port 12a. The electrical connectors located proximate manifold port 12a to which the temperature sensors S3 and S6 are connected are suitably interconnected by means (not shown) to different channels of the microcomputer which controls, in closed loop manner, the temperature of the dispenser 16a and hose 18a. The electrical connectors located proximate manifold port 12a to which heaters H3 and H6 are connected are suitably interconnected in series with their respectively associated signal-controlled switches, with each series-connected heater and signal-controlled switch combination being connected across an a.c. power supply to be described. Included in each microcomputer channel, for closed loop control of the temperature of the system component associated with said channel, are connections for the temperature sensor for the associated system component and for the control electrode of the signal-controlled switch through which the heater for that system component is energized. Thus, a channel for a given system component, e.g., dispenser 16a, includes connections to sensor S6, and connections to the signal-controlled switch which is in series with heater H6 associated with dispenser 16a. Similarly, the channel for hose 14a includes connections for sensor S3 and the signal-controlled switch control electrode in series with heater H3.

Figure 2:
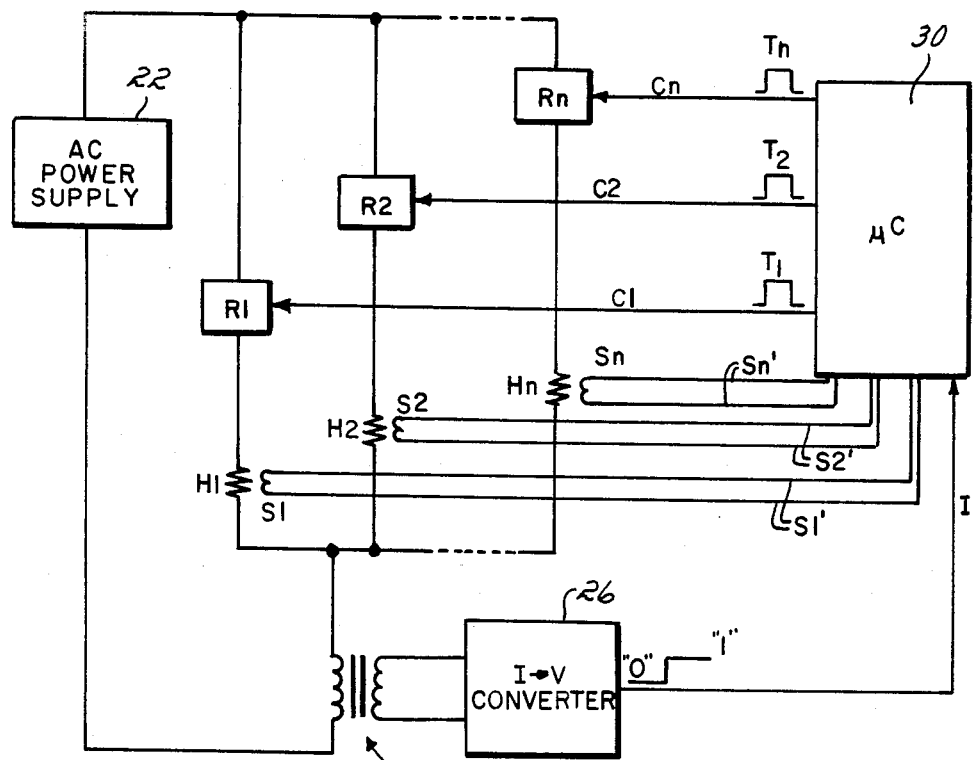
FIG. 2 is a schematic circuit drawing in block format of a closed loop control system capable of implementing the method of this invention.

A microcomputer-based closed loop temperature control system capable of implementing the channel connection error, sensor defect, and heater circuit component malfunction checking method of this invention is shown in FIG. 2. With reference to FIG. 2, the system is seen to include a plurality of heaters H1, H2, ... Hn, as well as associated temperature-sensing elements S1, S2, ... Sn, respectively. In series with each of the heaters H1, H2, ... Hn is a signal-controlled switch R1, R2, ... Rn, respectively. Switch R1, heater H1, and sensor S1 are associated with a single system component, such as reservoir 10. The same is true for switch R2, heater H2, and sensor S2, which may, for example, be associated with the manifold 12.

The series-connected heater and signal-controlled switch combinations R1/H1, R2/H2, ... Rn/Hn are connected in parallel, with the parallel circuit combination being connected in series with an AC power supply 22. Connected between the AC power supply 22 and the parallel combination of series-connected heaters and signal-controlled switches is the primary winding of a current transformer 24 which has its secondary winding input to a current-to-voltage converter 26, preferably an operational amplifier designed to provide a non-zero magnitude signal level corresponding to a binary "1" level when current is flowing in the primary winding of the current transformer 24. When current is not flowing through the primary of the current transformer 24 the output from the current-to-voltage converter 26 will be in the form of a logical "0" level signal. The current-to-voltage converter output signals are input to the microcomputer on line I.

Connected to the control electrode of each of the signal-controlled switches R1, R2, ... Rn, is a control line C1, C2, ... Cn. When variable duty cycle control signals T1, T2, ... Tn are input on line C1, C2, ... Cn to the signal-controlled switches R1, R2, ... Rn, the switches are rendered conductive for varying fractions of the control period, allowing AC power from supply 22 to pass therethrough to energize their respectively associated heaters H1, H2, ... Hn. In a preferred form of the invention, the control signals T1, T2, ... Tn are selected to have a controlled pulse width which varies between zero percent of the 300 ms control period when the sensor temperature is at or above its desired set point temperature, and one hundred percent when the sensor temperature is substantially below the desired set point temperature, with the control signal width at any given time being correlated to the magnitude of the difference between the actual sensor temperature and the desired set point temperature. The control signal width controls the duty cycle of the signal-controlled switches R1, R2, ... Rn, thereby controlling the degree of energization of the associated heaters H1, H2, ... Hn.

The temperature sensors S1, S2, ... Sn are connected to the microcomputer 30 via line pairs shown schematically as S1', S2', ... Sn'. Lines C1 and S1' associated with signal-controlled switch R1 which control energization of heater H1 constitutes one channel of the microcomputer 30, such as the channel for the reservoir 10. Similarly, lines C2 and S2' associated with signal-controlled switch R2, which controls energization of heater H2, constitutes another channel of the microcomputer 30, such as the channel for the manifold 12. Likewise, lines Cn and Sn' associated with signal-controlled switch Rn, which controls energization of heater Hn, constitutes the $n^{th}$ channel of the microcomputer 30, such as the channel for dispenser 16c.

In operation, the temperature of a sensor S1, S2, ... Sn is determined by connecting it to a regulated constant current source while monitoring the resultant voltage thereacross. The voltage is then digitized and with the aid of a look-up table stored in the microcomputer the temperature of the sensor S1, S2, ... Sn is determined. By comparing the sensor temperature with a set point value entered and stored in the microcomputer, a determination is made whether the temperature of the sensor is at or above the desired value, in which event the associated heater is not energized, or is below the set point value in which event a signal-controlled switch activating signal, T1, T2, ... Tn having a width corresponding to the difference between the actual and set point temperatures, is provided on the appropriate control line C1, C2, ... Cn to allow current to flow from the power supply 22 through the associated heater H1, H2, ... Hn for a fraction of the 300 ms control period corresponding to the width of the control signal, and thereby elevate the temperature of the system component associated with the sensor in question to the desired level.

Figure 3A:
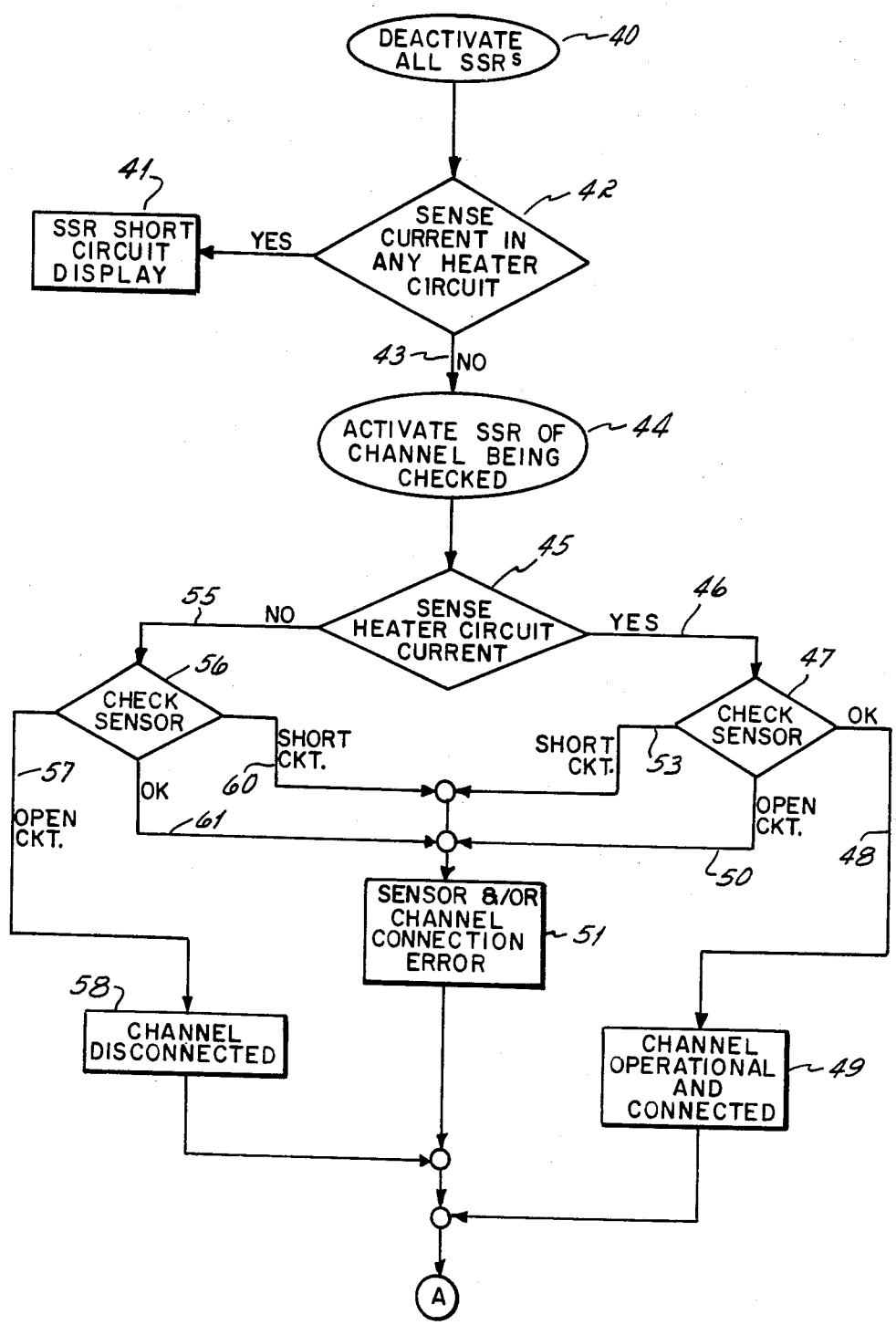
FIGS. 3a and 3b are flow charts for a microcomputer implementation of the method of this invention.

In order to determine which channels of the microcomputer are active, that is, which channels are operatively associated with a functional system component, such as a hose, manifold, reservoir, dispenser, or the like, having a heater and associated temperature sensor, the method illustrated in the flow chart of FIG. 3a is executed by the suitably programmed microcomputer. More particularly, and as designated in block 40, the microcomputer 30 provides deactivating signals on lines C1, C2, ... Cn to the control electrodes of the signal-controlled switches R1, R2, ... Rn for the purpose of rendering the signal-controlled switches non-conductive on a simultaneous basis. This step is designated with the reference numeral 40 in the flow chart of FIG. 3a. The microcomputer 30, as shown in step 42 of the flow chart of FIG. 3a, monitors line I from the current-to-voltage converter 26. If the switches R1, R2, ... Rn are not short circuited, the deactivating signals thereto on lines C1, C2, ... Cn will cause them to be nonconductive, in which event no current will flow thereto to the primary of current transformer 24, producing a logical zero level signal on the output line of the current-to-voltage converter 26. The microcomputer, sensing the presence of a logical zero signal, determines that no current is flowing through any of the signal-controlled switches R1, R2, ... Rn, which is appropriate since they are not activated, and the process proceeds along line 43 to decision block 44.

Had one or more of the signal-controlled switches R1, R2, ... Rn been short circuited, current would have passed therethrough to the primary winding of the current transformer 24, notwithstanding the absence of an activation signal on lines C1, C2, ... Cn. This would have produced a logic one signal on the output line I from the current-to-voltage converter 26. In response thereto the microcomputer 30 would provide a signal-controlled switch indication as designated by block 41.

Assuming the signal-controlled switches R1, R2, ... Rn are not short circuited, the process proceeds along line 43 to step 44. In accordance with step 44 the microcomputer provides an activating signal on line C1 having a logical one level for rendering signal-controlled switch R1 conductive. The process now proceeds to step 45. In accordance with step 45, the output of the current-to-voltage converter 26 on line I is checked for a logical one level signal indicating that current is flowing through the series circuit consisting of the activated signal-controlled switch R1 and the heater H1 to the primary winding of the current transformer 24. Assuming the microcomputer senses the logical one signal on line I, which indicates that the heater circuit H1 is not open circuited, the process proceeds along line 46 to step 47.

In step 47, the temperature sensor S1 is checked by inputting to the sensor on line S1 a constant current signal and monitoring the voltage thereacross. If the voltage thereacross, after digitizing and converting to a temperature utilizing the look-up table, falls within the upper and lower operating temperature limits stored in the microcomputer memory, the temperature sensor S1 is deemed to be operational and the process proceeds along line 48 to block 49 which reflects the fact that the status of channel 1 has now been fully checked and the determination made that a system component, e.g., the reservoir 10, is connected thereto having a fully operational signal-controlled switch R1, a heater H1 which is not open circuited, and a temperature sensor S1 which is also operational. The microcomputer stores this status information reflecting the connection to channel 1 of a fully operational system component.

In step 47, had the temperature sensor S1 been open circuited, the attempt to pass therethrough on line S1 a constant current signal from a regulated current supply would have produced across lines S1 a voltage of very large magnitude. The microcomputer, after digitizing this voltage and converting it to a temperature utilizing the look-up table stored in the microcomputer, would determine that the temperature of the sensor S1 is far above the upper operating temperature limit of the sensor, in which event the process would proceed along line 50 to block 51 indicating a sensor defect, namely, the connection to channel 1 of a system component having a open circuited temperature sensor.

If the sensor S1 is short circuited, in the sensor checking step 47 a very low voltage is reflected across lines S1 input to the microcomputer when a constant current from a regulated current supply is passed through sensor S1. This low current will produce a very low voltage across lines S1 which the microcomputer will convert, by reference to the temperature look-up table, to a temperature far below the lower temperature limit of the system, reflecting the short circuit condition of the sensor S1. Under such circumstance, the process proceeds along line 53 to the sensor defect status indicator 51.

If in step 45, with signal-controlled switch R1 energized by a logic one signal on control line C1 from the microcomputer, no current flows through the heater H1 to the primary winding of the current transformer 24, a logical zero signal is provided by the current-to-voltage converter 26 on line I, indicating that the heater H1 is not connected. Under such circumstances, the process proceeds along line 55 to step 56. In step 56, the condition of the temperature-sensing element S1 is checked, in the same manner it is checked in step 47 previously described. If the check of the condition of the temperature sensor S1 in step 56 shows that the temperature sensor is open circuited, the process proceeds along line 57 to a channel disconnected indicator shown by block 58. Thus, a channel disconnected indication in block 58 is produced if it is determined in step 45, as indicated by line 55, that no current flows through the heater H1 when signal-controlled switch R1 is energized by a logic one signal on control line C1 and the check of the status of sensor S1 in step 56 shows on line 57 that the temperature sensor S1 is open circuited.

If the check in step 56 of the condition of the sensor S1 shows that it is short circuited, the process proceeds on line 60 to the sensor defect indicator block 51. Similarly, if the check of the status of the sensor S1 in step 56 shows that it is operational, that is, its temperature is between the permissible upper and lower temperature limits, the process proceeds along line 61 to the channel configuration error 51. The results of the sensor status check in step 56 reflected by lines 60 and 61 reflect a channel configuration error inasmuch as a short circuited temperature sensor (line 60) or a properly functional temperature sensor (line 61) is inconsistent with the fact that the heater status check made in step 45 showed that no heater was connected (line 55).

Upon completion of the steps shown in the flow chart of FIG. 3a for a single channel, that is, for a single manifold, hose, dispenser, or the like, the system knows the status of that channel which is either that a fully operational signal-controlled switch, heater, temperature sensor channel is connected to the microprocessor channel (block 49), or nothing is connected to the channel (block 58), or there is a sensor and/or channel configuration error (block 51) in the form of a defective sensor or improperly connected sensor.

The steps reflected in FIG. 3a, particularly from block 44 and thereafter, are repeated for each channel on a sequential channel-by-channel basis until the status of all channels has been checked and the appropriate channel status determination made.

Figure 3B:
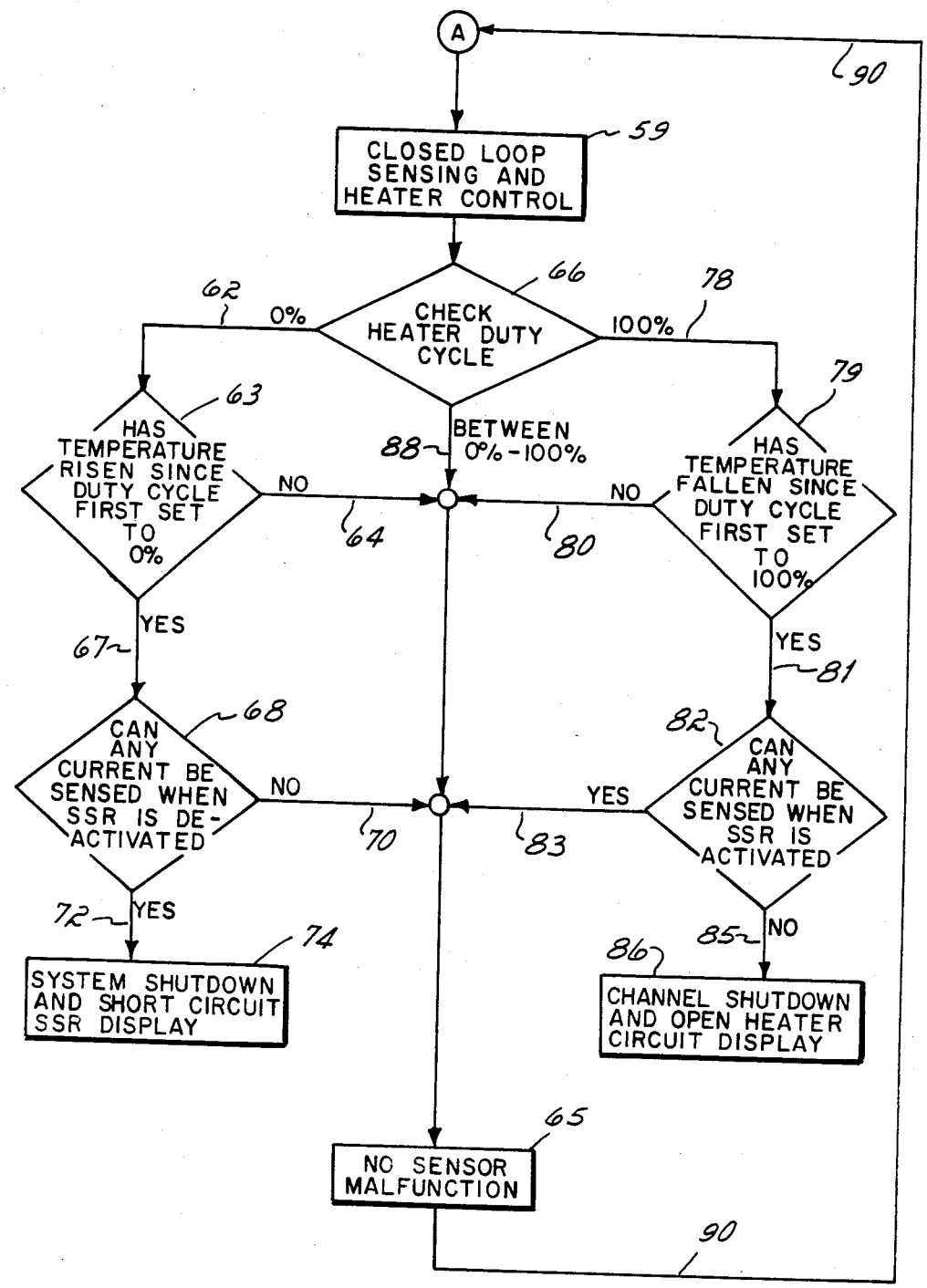

Thereafter the system enters the closed loop heater control phase (FIG. 3b) for those channels which are shown to be fully functional and connected in the process of FIG. 3a. More particularly, and with respect to such fully operational and connected channels, the microcomputer 30 periodically senses the temperatures of the various sensors S1, S2, ... Sn on a time division multiplex basis, and compares the sensed temperature to the desired set point temperature for that channel. If the sensed temperature is below the set point, the microcomputer will provide an activating signal of varying duty cycle on the control line C1, C2, ... Cn of the signal-controlled switch R1, R2, ... Rn of the channel having its temperature sensed, in which event the associated heater H1, H2, ... Hn will be energized to raise the temperature to the desired level. The magnitude of the duty cycle, as noted previously, depends on the extent to which the actual temperature is below the set point temperature. If the temperature is equal or greater than the set point, a logic zero will be provided on the control line C1, C2, ... Cn of the channel whose temperature sensor is being sensed, in which event the associated signal-controlled switch will not be energized and electrical power will not be supplied to the associated heater. The foregoing time division multiplex sensing of the temperature of the sensors of the various operational channels and heater energization thereof to effect closed loop temperature control is indicated by block 59.

Periodically, the microcomputer goes through a heater circuit component malfunction checking process. More particularly, and as shown in step 66, the control signal status on line C1, C2, ... Cn is checked to determine whether the respectively associated signal-controlled switches R1, R2, ... Rn are conductive or nonconductive and the associated heaters H1, H2, ... Hn are energized or de-energized. If in step 66 it is determined that a heater energization duty cycle is between zero percent (line 62) and one hundred percent (line 78), the process proceeds along line 88 to the "no sensor malfunction" block 65. If this check in step 66 shows that the heaters of all channels being checked are not being energized, indicating that their associated temperature sensors are above their desired set points, the process proceeds along line 62 to step 63. In step 63 the microcomputer checks to determine if the temperature of the sensor of a particular channel which it is desired to check has risen since the control signal on its control lines C1, C2, ... Cn was first set to a zero percent duty cycle indicating the de-energized condition of the heater of the channel being checked. If the temperature has not risen, the process proceeds along line 64 to the "no sensor malfunction" indicating block 65. If the temperature rise inquiry in step 63 reflects that the temperature has risen since the signal on the control line C1, C2, ... Cn of the channel being monitored was first set to zero percent duty cycle, the process proceeds along line 67 to step 68. In step 68 the current flowing in the heater circuit of the channel being monitored is sensed with the associated signal-controlled switch de-energized by the presence of a zero percent duty cycle on its associated control line. If there is no current flowing through the heater as sensed by the current transformer 24 and current-to-voltage converter 26, that is a logic zero level signal is provided on output line I to the microcomputer, the process proceeds along line 70 to the "no sensor malfunction" indicating block 65. If current flow is sensed through the heater of the channel being monitored, notwithstanding the presence of a zero percent duty cycle signal on the control line to which associated signal-controlled switch, the process proceeds along line 72 to a system shutdown and short circuited signal-controlled switch display as represented by block 74.

If in the switch control signal checking step 66 it is determined that a one hundred percent duty cycle control signal is present on the control line to any signal-controlled switch of any channel, which reflects maximum energization of the heater of that channel, such as for a duration of the 300 ms control period, the process proceeds along line 78 to step 79 wherein that channel is checked for an open circuit in the heater circuit. In step 79 an evaluation is made whether the temperature of the sensor of the channel being checked has fallen since the signal on its associated control line was first set to maximum heater energization. If it has not, the process proceeds along line 80 to the "no sensor malfunction" indicator of block 65. If the heater is being energized to the maximum extent and the temperature is not falling, the channel is deemed to be operating satisfactorily. If the temperature is falling, the process proceeds along line 81 to step 82. In step 82 the current flowing in the heater circuit is sensed when a one hundred percent duty cycle control signal is input to the associated control line of the channel being checked to render conductive its signal-controlled switch while deactivation signals are input to the signal-controlled switch control lines of all channels. If heater circuit current can be sensed, that is, a logic one signal level is output from the current-to-voltage converter 26 on line I, the process proceeds along line 83 to the "no sensor malfunction" indicator block 65. Under such circumstances, and even though the temperature has fallen since a one hundred percent duty cycle control signal appeared on the control line reflecting a desire for maximum heater energization, a sensor malfunction is not deemed to have occurred if current is flowing through the heater.

If no heater current flow in the channel being monitored is sensed in step 82, the process proceeds along line 85 to the channel shutdown and open heater circuit display. While the process can determine whether or not current is flowing through the heater circuit of the channel being monitored, if current is not flowing through the heater circuit, it is not possible to determine whether this is due to an open circuit heater, an open circuit signal-controlled switch, or an interruption in the wiring interconnecting the signal-controlled switch and heater to the AC power supply 22 and primary winding of the current transformer 24. In either case, however, it is necessary to shutdown the channel being monitored and provide an open heater circuit display. The periodic re-checking (step 66) of the various functional and properly connected channels is indicated by line 90 back to the control loop block 59.

The foregoing process reflected by steps 66 et seq., is repeated for each fully operational channel deemed to be properly connected (block 49). After all fully operational and properly connected channels have been checked, such channels are again checked in sequence and the process repeated.

While the invention has been described in connection with a preferred embodiment thereof, those skilled in the art will recognize that various changes and modifications can be made without departing from the spirit and scope of the invention which is more particularly defined by the appended claims.

What is claimed is:

1. For use in connection with a multi-component hot melt heating system wherein each component has an electric heater energized through a signal-controlled switch having a control electrode and an associated temperature sensor, and wherein the components are each connected to a different channel of a multi-channel microprocessor for individual closed loop temperature control of each component, a method of checking each channel to determine the component status thereof, comprising the steps of:
    (a) providing control signals to the control electrode output lines of each microcomputer channel to render nonconductive any signal-controlled switches having their respective control electrode connected to the input of a channel;
    (b) sensing the current flow through the heaters with a current sensor common to all heater energization circuits and providing a short circuited switch indication if significant current flow exists;
    (c) providing control signals to the control electrode output line of a specific individual channel to be checked to render conductive the signal-controlled switch having its control electrode connected thereto;
    (d) sensing heater current flow with a current sensor common to all heater energization circuits; and
    (e) in response to significant sensed heater current flow in step (d), checking the temperature sensor connected to the specific individual channel being checked, and if it is neither open circuited nor short circuited, providing an indication that a fully operational component is connected to the specific channel being checked.

2. The method of claim 1 further including the step of:
   providing an indication that the sensor connected to the specific channel being checked is defective if in step (e) the sensor condition is determined to be open circuited and/or short circuited.

3. The method of claim 1 further including the step of:
   in response to the absence of significant sensed heater current flow in step (d), checking the temperature sensor input of the specific channel being checked, and if an open circuit condition is sensed, providing an indication that a component is not connected to the specific individual channel being checked.

4. The method of claim 1 further including the step of:
   in response to the absence of significant sensed heater current flow in step (d), checking the temperature sensor connected to the specific channel being checked, and if a short circuit sensor condition is sensed, providing an indication that the sensor connected to the specific channel being sensed is short circuited.

5. The method of claim 1 further including the step of:
   in response to the absence of significant sensed heater current flow in step (d), checking the temperature sensor connected to the specific channel being checked, and if neither a short circuit nor open circuit sensor condition is sensed, providing an indication that the sensor is misconnected to the specific channel being checked.

6. For use in connection with a multi-component hot melt heating system wherein each component has an electric heater energized through a signal-controlled switch having a control electrode and an associated temperature sensor, and wherein the components are each connected to a different channel of a multi-channel microprocessor for individual closed loop temperature control of each component, a method of checking each channel to determine the component status thereof, comprising the steps of:
   (a) providing control signals to the control electrode output lines of each microcomputer channel to render nonconductive any signal-controlled switches having their respective control electrode connected to the input of a channel;
   (b) sensing the current flow through the heaters with a current sensor common to all heater energization circuits and providing a short circuited switch indication if significant current flow exists;
   (c) providing control signals to the control electrode output line of a specific individual channel to be checked to render conductive the signal-controlled switch having its control electrode connected thereto;
   (d) sensing heater current flow with a current sensor common to all heater energization circuits; and
   (e) in response to the absence of significant sensed heater current flow in step (d), checking the temperature sensor connected to the specific channel being checked, and if neither a short circuit nor open circuit sensor condition is sensed, providing an indication that the sensor is misconnected to the specific channel being checked.

7. For use in connection with a multi-component hot melt heating system wherein each component has an electric heater energized through a signal-controlled switch having a control electrode and an associated temperature sensor, and wherein the components are each connected to a different channel of a multi-channel microprocessor for individual closed loop temperature control of each component, a method of checking each channel to determine the component status thereof, comprising the steps of:
   (a) providing control signals to the control electrode output lines of each microcomputer channel to render nonconductive any signal-controlled switches having their respective control electrode connected to the input of a channel;
   (b) sensing the current flow through the heaters with a current sensor common to all heater energization circuits and providing a short circuited switch indication if significant current flow exists;
   (c) providing control signals to the control electrode output line of a specific individual channel to be checked to render conductive the signal-controlled switch having its control electrode connected thereto;
   (d) sensing heater current flow with a current sensor common to all heater energization circuits; and
   (e) in response to the absence of significant sensed heater current flow in step (d), checking the temperature sensor input of the specific channel being checked, and if an open circuit condition is sensed, providing an indication that a component is not connected to the specific individual channel being checked.

8. For use in connection with a multi-component hot melt heating system wherein each component has an electric heater energized through a signal-controlled switch having a control electrode and an associated temperature sensor, and wherein the components are each connected to a different channel of a multi-channel microprocessor for individual closed loop temperature control of each component, a method of checking each channel to determine the component status thereof, comprising the steps of:
   (a) providing control signals to the control electrode output lines of each microcomputer channel to render nonconductive any signal-controlled switches having their respective control electrode connected to the input of a channel;
   (b) sensing the current flow through the heaters with a current sensor common to all heater energization circuits and providing a short circuited switch indication if significant current flow exists;
   (c) providing control signals to the control electrode output line of a specific individual channel to be checked to render conductive the signal-controlled switch having its control electrode connected thereto;
   (d) sensing heater current flow with a current sensor common to all heater energization circuits; and
   (e) in response to the absence of significant sensed heater current flow in step (d), checking the temperature sensor connected to the specific channel being checked, and if a short circuit sensor condition is sensed, providing an indication that the sensor connected to the specific channel being sensed is short circuited.

* * * * *